US012574435B2

(12) United States Patent
Gonigberg et al.

(10) Patent No.: US 12,574,435 B2
(45) Date of Patent: Mar. 10, 2026

(54) SYSTEMS AND METHODS FOR REDUCING NETWORK CONNECTION CHURN

(71) Applicant: Netflix, Inc., Los Gatos, CA (US)

(72) Inventors: Arthur Gonigberg, San Jose, CA (US); Argha Chattopadhyay, San Jose, CA (US)

(73) Assignee: Netflix, Inc., Los Gatos, CA (US)

( * ) Notice: Subject to any disclaimer, the term of this patent is extended or adjusted under 35 U.S.C. 154(b) by 34 days.

(21) Appl. No.: 18/799,614

(22) Filed: Aug. 9, 2024

(65) Prior Publication Data

US 2025/0055906 A1 Feb. 13, 2025

Related U.S. Application Data

(60) Provisional application No. 63/519,219, filed on Aug. 11, 2023.

(51) Int. Cl.
*H04L 67/1008* (2022.01)
*H04L 67/1014* (2022.01)

(52) U.S. Cl.
CPC ...... *H04L 67/1008* (2013.01); *H04L 67/1014* (2013.01)

(58) Field of Classification Search
None
See application file for complete search history.

(56) References Cited

U.S. PATENT DOCUMENTS

| | | | |
|---|---|---|---|
| 9,794,612 B1 * | 10/2017 | Lam | H04N 21/4181 |
| 2010/0061233 A1 * | 3/2010 | Golwalkar | H04L 67/14 |
| | | | 370/230 |
| 2020/0396280 A1 | 12/2020 | Norris | |
| 2020/0412707 A1 * | 12/2020 | Siefker | H04L 63/101 |
| 2020/0412825 A1 * | 12/2020 | Siefker | H04L 67/1027 |
| 2021/0109942 A1 * | 4/2021 | Bandhu | H04L 67/1008 |

FOREIGN PATENT DOCUMENTS

CN 112954006 A 6/2021

OTHER PUBLICATIONS

2016 USENIX Annual Technical Conference, USENIX, The Advanced Computing Systems Association, Jun. 22, 2016, pp. 1-673.
(Continued)

*Primary Examiner* — Quang N Nguyen
(74) *Attorney, Agent, or Firm* — Greenberg Traurig, LLP

(57) ABSTRACT

The disclosed computer-implemented method may include receiving, by a network gateway service, a service request from a client device. The method may also include assigning, by the network gateway service, the service request to an event loop. Additionally, the method may include determining, by the network gateway service, a destination of the event loop based on one or more resources of one or more nodes in a ring of nodes. Furthermore, the method may include creating, by the network gateway service, a connection pool for the event loop to select a node subset of the ring of nodes based on a mapping of event loops to node subsets. Finally, the method may include performing, by the network gateway service, load balancing of the connection pool to execute the service request. Various other methods, systems, and computer-readable media are also disclosed.

17 Claims, 10 Drawing Sheets

(56) References Cited

OTHER PUBLICATIONS

International Search Report and Written Opinion for International Application No. PCT/US2024/041960, mailed Nov. 27, 2024; 9 pages.
Ward, P. et al., "Reinventing Backend Subsetting at Google", Designing an Algorithm With Reduced Connection Churn That Could Replace Deterministic Subsetting, Performance, Acmqueue, Sep.-Oct. 2022, pp. 33-57; 25 pages.

* cited by examiner

Method
100

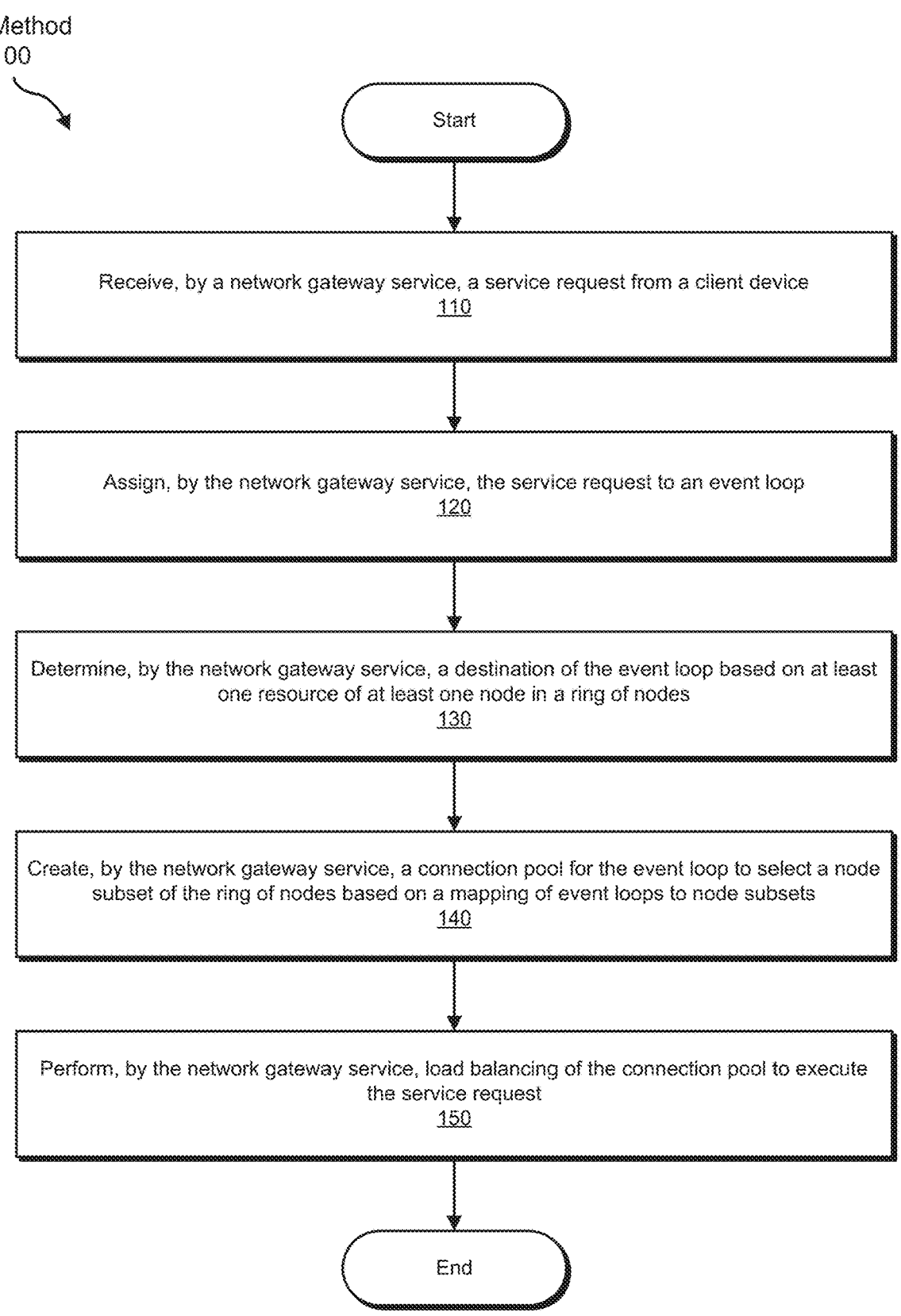

Start

Receive, by a network gateway service, a service request from a client device
110

Assign, by the network gateway service, the service request to an event loop
120

Determine, by the network gateway service, a destination of the event loop based on at least one resource of at least one node in a ring of nodes
130

Create, by the network gateway service, a connection pool for the event loop to select a node subset of the ring of nodes based on a mapping of event loops to node subsets
140

Perform, by the network gateway service, load balancing of the connection pool to execute the service request
150

End

*FIG. 1*

800
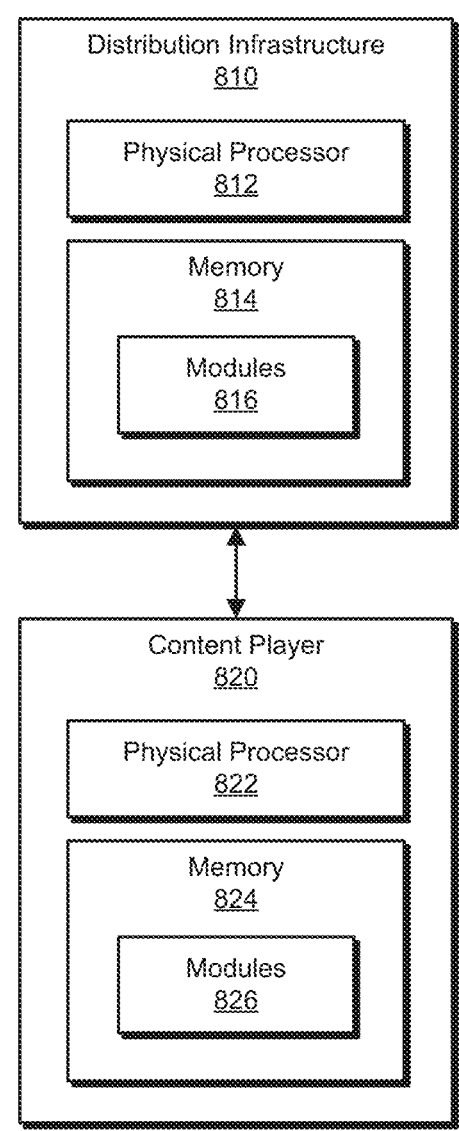
Distribution Infrastructure
810
Physical Processor
812
Memory
814
Modules
816
Content Player
820
Physical Processor
822
Memory
824
Modules
826
*FIG. 8*

SYSTEMS AND METHODS FOR REDUCING NETWORK CONNECTION CHURN

CROSS REFERENCE TO RELATED APPLICATION

This application claims the benefit of U.S. Provisional Application No. 63/519,219, filed 11 Aug. 2023, the disclosures of each of which are incorporated, in their entirety, by this reference.

BACKGROUND

Some gateway services provide various computing network benefits such as dynamic routing, network monitoring, resiliency, and network security. When a client device requests microservices from backend servers, these requests can generate event loops that then connect to instances of the backend servers. For example, by using a New Input/Output (NIO) client server framework, such services can use independent event loops for non-blocking execution of requests. This enables the entirety of a request-response cycle to happen within a single thread, thereby reducing context switching that would be required for multiple threads or connections and that may be computationally costly.

Traditional methods of reducing contention among event loops may create connection pools for each event loop to keep them separate. However, if each event loop has a connection pool that connects to every origin server, the number of connections can quickly increase with the increase of event loops, servers, and/or gateway service instances. For example, with a 16-core machine that connects to a set of 800 servers, there would be a total of 12,800 connections. Then, if each of the 16 cores run 100 separate instances, this would increase to 1,280,000 connections. Additionally, as other technologies like streaming applications increase in use, particularly as they move to using mutual Transport Layer Security (mTLS) authentication and service meshes, the connections can exponentially increase as network traffic spikes. The increased number of connections creates high connection churn whenever there is a change in the system. Furthermore, these systems become increasingly difficult to balance network traffic and load on servers. Thus, better methods of allocating network traffic are needed to decrease network connection churn and dynamically handle network scaling.

SUMMARY

As will be described in greater detail below, the present disclosure describes systems and methods for subsetting and load balancing to reduce network connection churn. In one example, a computer-implemented method for reducing network connection churn may include receiving, by a network gateway service, a service request from a client device. The method may also include assigning, by the network gateway service, the service request to an event loop. In addition, the method may include determining, by the network gateway service, a destination of the event loop based on one or more resources of one or more nodes in a ring of nodes. Furthermore, the method may include creating, by the network gateway service, a connection pool for the event loop to select a node subset of the ring of nodes based on a mapping of event loops to node subsets. Finally, the method may include performing, by the network gateway service, load balancing of the connection pool to execute the service request.

In one embodiment, the event loop may include a mechanism to handle asynchronous requests for the network gateway service.

In one example, determining the destination of the event loop may further include determining the one or more nodes is in the selected node subset.

In some embodiments, the mapping of event loops to node subsets may include an initial load balancing of the ring of nodes to evenly distribute event loops among node subsets. In these embodiments, the initial load balancing of the ring of nodes may include dynamically scaling the node subset based on a target subset size and a replication factor and then dividing nodes of the ring of nodes into subsets based on the target subset size and the replication factor. In these embodiments, the target subset size may be dynamically calculated based on a number of nodes in the ring of nodes and the replication factor. In these embodiments, the replication factor may be determined based on a type of node of the ring of nodes, a type of server of one or more nodes in the ring of nodes, a type of instance, a type of service request, and/or a network traffic profile of the network gateway service. In these embodiments, dynamically scaling the node subset may further include determining a number of total requests and adjusting the target subset size based on the number of total requests.

In some examples, creating the connection pool for the event loop may include selecting a set of other event loops with destinations to nodes in the node subset and sharing a connection to the node subset for the event loop and the set of other event loops. In these examples, sharing the connection to the node subset may include multiplexing a data stream from the event loop with data streams from the set of other event loops and transmitting a multiplexed data stream to the node subset over the connection. In these examples, performing load balancing of the connection pool may include applying a load-balancing algorithm to the event loop and the set of other event loops of the connection pool. Additionally, performing load balancing of the connection pool may include selecting, for the event loop, a preferred node of the node subset based on utilization of each node in the node subset and executing the service request using a server of the preferred node.

In addition, a corresponding system for reducing network connection churn may include several modules stored in memory, including a reception module that receives, by a network gateway service, a service request from a client device. The system may also include an assignment module that assigns the service request to an event loop. In addition, the system may include a determination module that determines a destination of the event loop based on one or more resources of one or more nodes in a ring of nodes. Furthermore, the system may include a creation module that creates a connection pool for the event loop to select a node subset of the ring of nodes based on a mapping of event loops to node subsets. Additionally, the system may include a performance module that performs load balancing of the connection pool to execute the service request. Finally, the system may include one or more processors that execute the reception module, the assignment module, the determination module, the creation module, and the performance module.

In one embodiment, the mapping of event loops to node subsets may include a distribution of nodes of the ring of nodes into subsets based on a target subset size and a replication factor. In this embodiment, the creation module may further calculate the target subset size based on a number of nodes in the ring of nodes and the replication factor.

In one example, the system may further include a construction module, stored in memory, that constructs the ring of nodes by loading instances for a set of servers, shuffling an order of the instances, and creating nodes corresponding to the order of the instances. In this example, the construction module may further construct the ring of nodes by registering a new server for the network gateway service to a service registry, loading a set of instances for the new server, shuffling an updated order of the instances to include the new server, adding a new node to the ring of nodes corresponding to a new instance, and ordering the ring of nodes in the updated order of the instances. In this example, the creation module may further dynamically update the mapping of event loops to node subsets by detecting the construction module adding the new node to the ring of nodes and adding the new node to an existing subset, based on a target subset size. Additionally or alternatively, in the above example, the construction module may further construct the ring of nodes by removing an existing server of the network gateway service from the service registry, shuffling the updated order of the instances to exclude the existing server, removing an existing node corresponding to the existing server from the ring of nodes, and ordering the ring of nodes in the updated order of the instances. In this example, the creation module may further dynamically update the mapping of event loops to node subsets by detecting the construction module removing the existing node from the ring of nodes, removing the existing node from one or more existing subsets, and adjusting the one or more existing subsets based on a target subset size.

In some examples, the above-described method may be encoded as computer-readable instructions on a computer-readable medium. For example, a computer-readable medium may include one or more computer-executable instructions that, when executed by at least one processor of a computing device, may cause the computing device to receive, by a network gateway service, a service request from a client device. The instructions may also cause the computing device to assign, by the network gateway service, the service request to an event loop. In addition, the instructions may cause the computing device to determine, by the network gateway service, a destination of the event loop based on one or more resources of one or more nodes in a ring of nodes. Furthermore, the instructions may cause the computing device to create, by the network gateway service, a connection pool for the event loop to select a node subset of the ring of nodes based on a mapping of event loops to node subsets. Finally, the instructions may cause the computing device to perform, by the network gateway service, load balancing of the connection pool to execute the service request.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 1 is a flow diagram of an exemplary method for reducing network connection churn.

FIG. 8 is a block diagram of an exemplary content distribution ecosystem.

Figure 2:
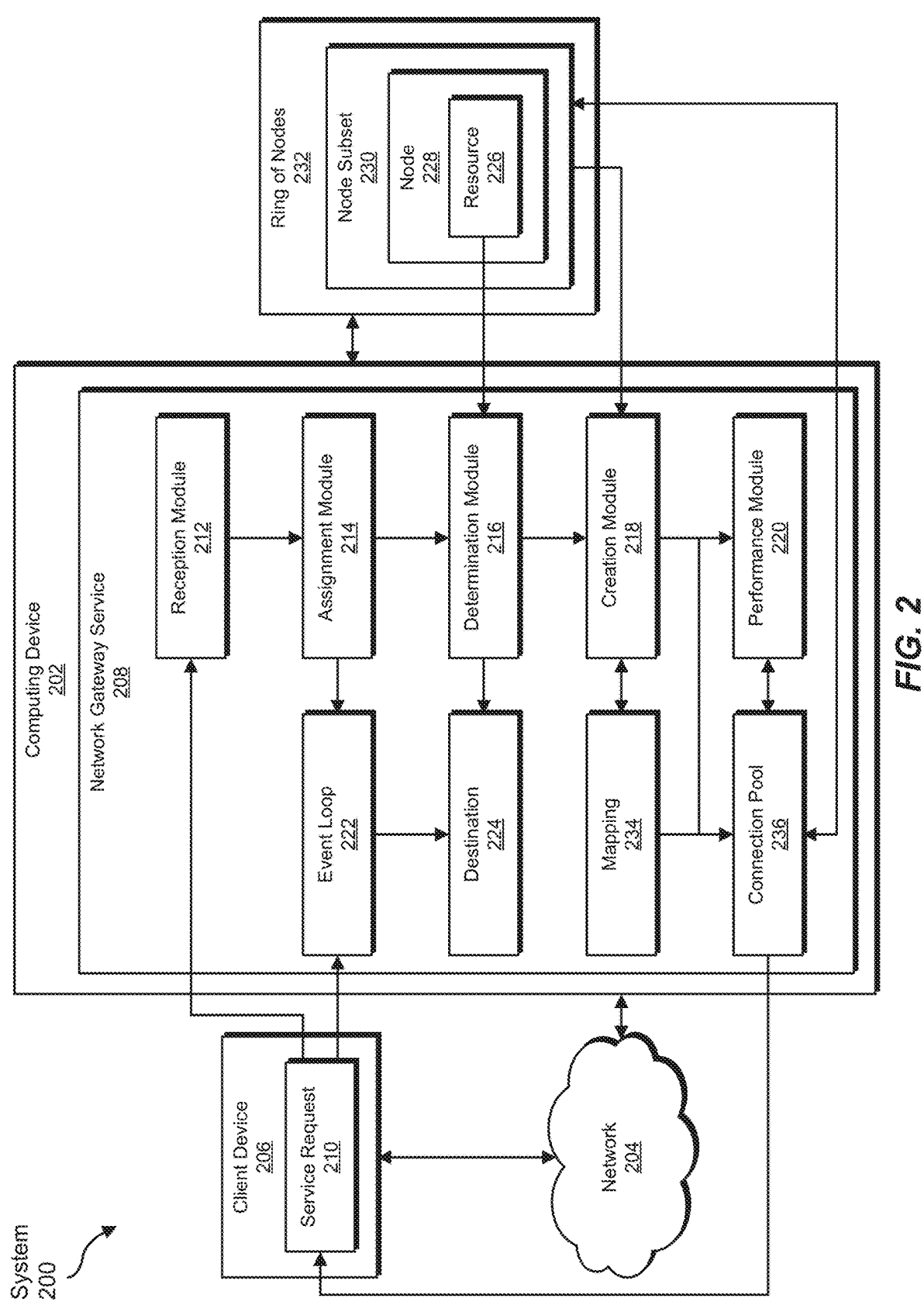
FIG. 2 is a block diagram of an exemplary computing system for reducing network connection churn.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to reducing network connection churn for a network gateway service or server-side services. As will be explained in greater detail below, embodiments of the present disclosure may, by using client-side decentralized load balancing in conjunction with connection pooling, enable elastic replication and scaling of node subsets for servers. The disclosed systems and methods may first create a distribution ring of nodes corresponding to backend or origin servers. For example, when a new server is added to a network, a service registry registers the server, and a gateway service creates a new distribution ring, or updates a distribution ring, to include the new server. By calculating an optimal size of a subset that would achieve the ideal replication factor for a given cardinality of nodes, the systems and methods described herein may dynamically divided the ring of nodes into appropriate subsets. For example, the systems and methods described herein may determine a preferred replication factor based on the type of servers or hardware used by the network gateway service and ensure data is replicated, or copied, to each subset. As another example, the systems and methods described herein may determine the cardinality, or number of nodes, needed for each subset based on how data is replicated and which nodes include the replications. In some examples, the disclosed systems and methods may work backward to divide the ring into even slices based on the computed subset size. The optimal subset size can ensure the system continues to provide good balance and resiliency features across servers. In addition, by dynamically update the ring of nodes when servers are added or removed to create updated subsets, the disclosed systems and methods may adjust the allocation of service requests in real time. For example, by increasing subsets until the desired subset size is achieved, the system can scale a replication factor across backend servers, especially as they scale up or down based on traffic patterns.

When the network gateway service receives a service request from a client device or a website, disclosed systems and methods may assign the service request to an event loop, which can act as a dispatcher to handle the request. By mapping event loops to subsets, the systems and methods described herein may obtain a limited subset of nodes for a particular event loop and determine a destination for the event loop in the subset. In other words, each thread or programming instruction connects to only a subset of servers or nodes rather than connecting to each server or node in the overall ring of nodes. Furthermore, the disclosed systems and methods may load a connection pool associated with the subset to pool multiple event loops, thereby limiting the number of connections to which an event loop connects while maintaining connections between all backend servers and the gateway service. The disclosed systems and methods may then perform additional load balancing for the event loop to ensure the load on backend servers continues to be consistent and evenly distributed.

The systems and methods described herein may improve the functioning of a computing device by reducing the resources needed to provide a large number of connections between each event loop and each node or server instance and by connection pooling to reduce connections even further. In addition, these systems and methods may also enable decentralized, client-side load balancing through dynamically scaling subsets of nodes to account for variations in deployment hardware and configurations. Thus, the disclosed systems and methods may improve over traditional methods of reducing network connection churn by enabling elastic subsets and applying load balancing to event loops rather than instances.

Thereafter, the description will provide, with reference to FIG. 1, detailed descriptions of computer-implemented methods for reducing network connection churn. Detailed descriptions of a corresponding exemplary computing system will be provided in connection with FIG. 2. Detailed descriptions of an exemplary ring of nodes with exemplary subsets will be provided in connection with FIG. 3. In addition, detailed descriptions of an exemplary connection pooling of exemplary event loops to exemplary node subsets will be provided in connection with FIG. 4. Detailed descriptions of an exemplary connection pooling of exemplary event loops to an exemplary ring of nodes without subsets will be provided in connection with FIG. 5. Furthermore, detailed descriptions of an exemplary connection pooling of exemplary event loops to alternate exemplary node subsets will be provided in connection with FIG. 6. Additionally, detailed descriptions of an update to an exemplary ring of nodes will be provided in connection with FIG. 7.

Because many of the embodiments described herein may be used with substantially any type of computing network, including distributed networks designed to provide video content to a worldwide audience, various computer network and video distribution systems will initially be described with reference to FIGS. 8-10. These figures will introduce the various networks and distribution methods used to provision video content to users.

FIG. 1 is a flow diagram of an exemplary computer-implemented method 100 for reducing network connection churn. The steps shown in FIG. 1 may be performed by any suitable computer-executable code and/or computing system, including the systems illustrated in FIGS. 8-10, computing device 202 in FIG. 2, client device 206, ring of nodes 232, or a combination of one or more of the same. In one example, each of the steps shown in FIG. 1 may represent an algorithm whose structure includes and/or is represented by multiple sub-steps, examples of which will be provided in greater detail below. In some examples, all of the steps and sub-steps represented in FIG. 1 may be performed by one device (e.g., either a server or a client computing device). Alternatively, the steps and/or substeps represented in FIG. 1 may be performed across multiples devices (e.g., some of steps and/or sub-steps may be performed by a server and other steps and/or sub-steps may be performed by a client computing device).

As illustrated in FIG. 1, at step 110, one or more of the systems described herein may receive, by a network gateway service, a service request from a client device. For example, FIG. 2 is a block diagram of an exemplary system 200 for reducing network connection churn. As illustrated in FIG. 2, a reception module 212 may, as part of a computing device 202, receive, by a network gateway service 208, a service request 210 from a client device 206.

In some embodiments, computing device 202 may generally represent a device capable of processing and allocating requests for network services to backend servers. In some examples, computing device 202 may represent a device or server that is part of a server group. In these examples, the server group may include a distributed system with a set of backend servers that services requests for a set of client devices. Computing device 202 may alternatively generally represent any type or form of server that is capable of storing and/or managing data or requests, such as handling service request 210 for a server group. Examples of a server include, without limitation, security servers, application servers, web servers, storage servers, streaming servers, and/or database servers configured to run certain software applications and/or to provide various security, web, storage, streaming, and/or database services. Additionally, computing device 202 may include distribution infrastructure 810 and/or various other components of FIGS. 8-10.

Although illustrated as part of computing device 202 in FIG. 2, some or all of the modules described herein may alternatively be executed by a separate server or any other suitable computing device. For example, network gateway service 208 may represent a separate device for managing all incoming requests from client devices and sending them to computing device 202 to allocate to backend servers.

In the above embodiments, computing device 202 may be directly in communication with other servers and/or in communication with other computing devices, such as a client device 206 and/or servers in a ring of nodes 232, via a network, such as a network 204 of FIG. 2. In some examples, the term "network" may refer to any medium or architecture capable of facilitating communication or data transfer. Examples of networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), network 930 of FIG. 9, or any other suitable network. For example, network 204 may facilitate data transfer between computing device 202 and client device 206 using wireless or wired connections and between computing device 202 and a server in ring of nodes 232.

In some examples, client device 206 may generally represent any type or form of computing device capable of running computing software and applications, such as applications that request network services. As used herein, the term "application" generally refers to a software program designed to perform specific functions or tasks and capable of being installed, deployed, executed, and/or otherwise implemented on a computing system. Examples of applications may include, without limitation, playback application 1010 of FIG. 10, productivity software, enterprise software, entertainment software, security applications, cloud-based applications, web applications, mobile applications, content access software, simulation software, integrated software, application packages, application suites, variations or combinations of one or more of the same, and/or any other suitable software application. Examples of client devices may include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, or any other suitable computing device. Additionally, client devices may include content player 820 in FIGS. 8 and 10 and/or various other components of FIGS. 8-10.

The systems described herein may perform step 110 in a variety of ways. The terms "request" and "service request," as used herein, generally refer to communication from a client to a server, particularly to send or receive data or to perform a function for an application. The term "in-flight request" generally refers to a request that has been initiated but not fulfilled, such as a request that is sent by a client device but has not yet received a response from a server. As illustrated in FIG. 2, service request 210 is an in-flight request until it is received and fulfilled by network gateway service 208 of computing device 202 and/or a server of ring of nodes 232. The term "network gateway service," as used herein, generally refers to an application of a gateway that handles in-flight requests and provides network services, such as dynamic routing and security, for backend servers. In other words, network gateway service 208 may act as a middleman to process in-flight requests and appropriately allocate them.

Returning to FIG. 1, at step 120, one or more of the systems described herein may assign, by the network gateway service, the service request to an event loop. For example, an assignment module 214 may, as part of computing device 202 in FIG. 2, assign service request 210 to an event loop 222.

The systems described herein may perform step 120 in a variety of ways. In some examples, event loop 222 may include a mechanism to handle asynchronous requests for network gateway service 208. For example, event loop 222 may request and wait for data from client device 206, detect the reception of data as an event, and then call an event handler to dispatch the event. In these examples, service request 210 may remain in event loop 222 for the duration of a request-response cycle. The term "request-response cycle," as used herein, generally refers to a data communication process wherein a client requests data from a server, and the server responds with the requested data.

Returning to FIG. 1, at step 130, one or more of the systems described herein may determine, by the network gateway service, a destination of the event loop based on one or more resources of one or more nodes in a ring of nodes. For example, a determination module 216 may, as part of computing device 202 in FIG. 2, determine a destination 224 of event loop 222 based on resource 226 of node 228 in ring of nodes 232.

The systems described herein may perform step 130 in a variety of ways. As used herein, the term "node" generally refers to a connection or an endpoint in a network. For example, node 228 may represent a backend server in a network of servers. As another example, each backend server may include multiple instances, and node 228 may represent an instance of a server. In one embodiment, determination module 216 may determine destination 224 of event loop 222 by further determining node 228 is in a node subset 230.

Figure 4:
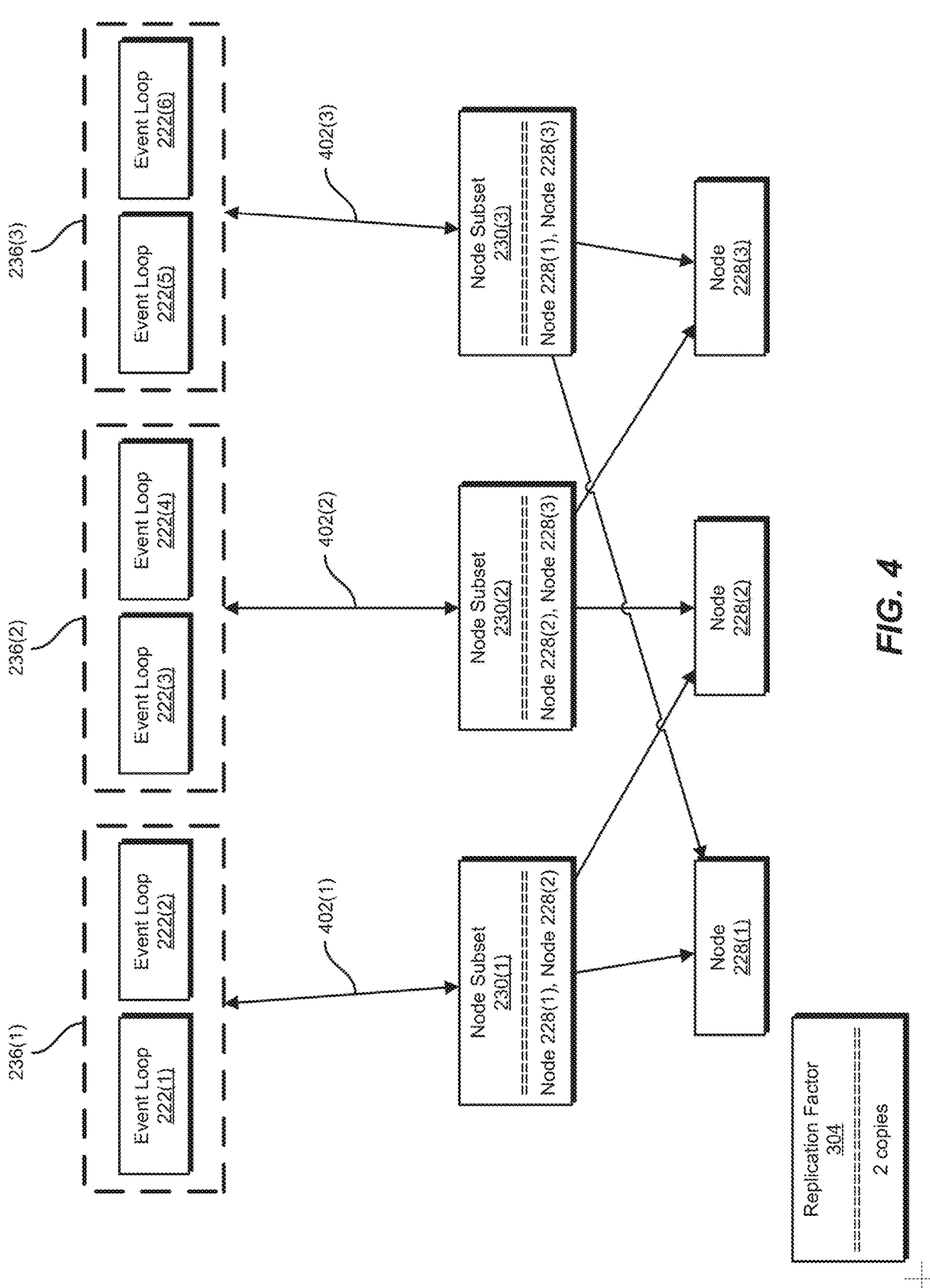
FIG. 4 is a block diagram of an exemplary connection pooling of exemplary event loops to exemplary node subsets.

In the example of FIG. 4, an event loop 222(1) may request a service using a resource included in a node 228(1) and a node 228(3). In this example, determination module 216 may determine a destination of node 228(1), which is a part of node subsets 230(1) and 230(3). Similarly, an event loop 222(2) may request a resource of node 228(2), and determination module 216 may determine a destination of node 228(2), which is also a part of node subset 230(1). In these examples, determination module 216 may determine a destination of each event loop for each service request received by network gateway service 208, which may occur near simultaneously. In other examples, determination module 216 may determine destinations of event loops based on an allocation or load balancing scheme for ring of nodes 232.

Returning to FIG. 1, at step 140, one or more of the systems described herein may create, by the network gateway service, a connection pool for the event loop to select a node subset of the ring of nodes based on a mapping of event loops to node subsets. For example, a creation module 218 may, as part of computing device 202 in FIG. 2, create a connection pool 236 for event loop 222 to select node subset 230 of ring of nodes 232 based on a mapping 234 of event loops to node subsets.

The systems described herein may perform step 140 in a variety of ways. As used herein, the term "connection churn" generally refers to a rate of newly opened connections. The term "connection pooling," as used herein, generally refers to a technique to reduce the number of open connections, or connection churn, by reusing the same connection for multiple requests. Similarly, the term "connection pool" generally refers to a group of requests pooled together to share a connection.

In some examples, mapping 234 of event loops to node subsets includes an initial load balancing of ring of nodes 232 to evenly distribute event loops among node subsets. The term "load balancing," as used herein, generally refers to a process of distributing network traffic or requests across multiple resources, such as a set of servers. The term "network traffic" generally refers to any data transmitted through a network. In these examples, the initial load balancing of ring of nodes 232 may include dynamically scaling node subset 230 based on a target subset size and a replication factor and dividing nodes of ring of nodes 232 into subsets based on the target subset size and the replication factor. In these examples, creation module 218 may dynamically scale node subset 230 by further determining a number of total requests and adjusting the target subset size based on the number of total requests. The term "replication factor," a used herein, generally refers to a number of times data is replicated. For example, a replication factor may include a number of nodes containing a copy of a particular piece of data. As another example, the replication factor may represent replication of subsets across event loops.

In some embodiments, creation module 218 may dynamically calculate the target subset size based on a number of nodes in ring of nodes 232 and the replication factor. In these embodiments, the replication factor may be determined based on a type of node of ring of nodes 232, a type of server of node 228, a type of instance, a type of service request 210, or a network traffic profile of network gateway service 208. As used herein, the term "instance" generally refers to a physical or virtual machine running on a server or network gateway. For example, each core in a server can run multiple instances simultaneously, increasing the usage of each server. Node 228 may correspond to a single server or to an instance of a backend server. In these embodiments, an ideal replication factor may depend on an environment of system 200, including the types of hardware and the configuration of machines. The ideal subset size may then depend on the replication factor, along with other dynamically changing factors such as the amount of network traffic and the combination of nodes. Additionally, in the above embodiments, mapping 234 of event loops to node subsets may include a distribution of nodes of ring of nodes 232 into subsets based on the target subset size and the replication factor.

Figure 3:
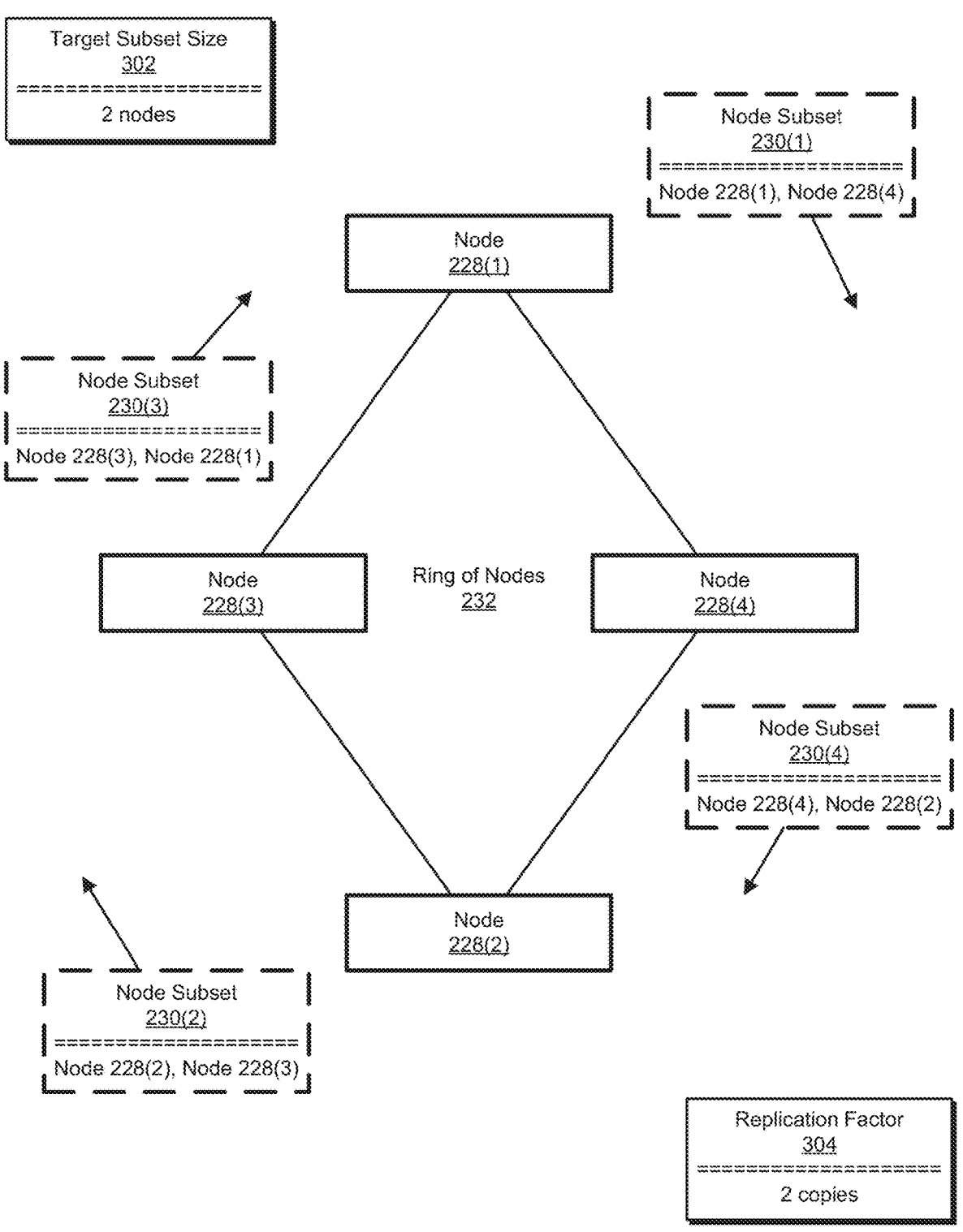
FIG. 3 is a block diagram of an exemplary ring of nodes with exemplary subsets.

As illustrated in FIG. 3, ring of nodes 232 may include nodes 228(1)-(4) divided into node subsets 230(1)-(4). In this example, a target subset size 302 of 2 nodes per subset may be calculated based on a replication factor 304 of 2. In this example, replication factor 304 may depend on a number of service requests received, the type of servers of nodes 228(1)-(4), and/or any other suitable method of determining an amount of replication needed for stability and to ensure fulfillment of all service requests in a timely manner.

In one example, creation module 218 may create connection pool 236 of FIG. 2 for event loop 222 by selecting a set of other event loops with destinations to nodes in node subset 230 and sharing a connection to node subset 230 for event loop 222 and the set of other event loops. In this example, sharing the connection to node subset 230 may include multiplexing a data stream from event loop 222 with data streams from the set of other event loops and transmitting a multiplexed data stream to node subset 230 over the connection. The term "multiplexing," as used herein, generally refers to a process of combining multiple input signals to an output signal. For example, by using Hypertext Transfer Protocol 2.0 (HTTP/2), multiple requests can be multiplexed over a single connection and only pay a cost of Transport Layer Security (TLS) authentication and handshaking once. By holding onto the connection to transmit multiple requests, network gateway service 208 may reduce connection churn to pool multiple event loops. Additionally, by partitioning ring of nodes 232 into subsets, the disclosed systems and methods enable a reduction in total connections while leveraging multiplexing to maintain throughput.

Figure 5:
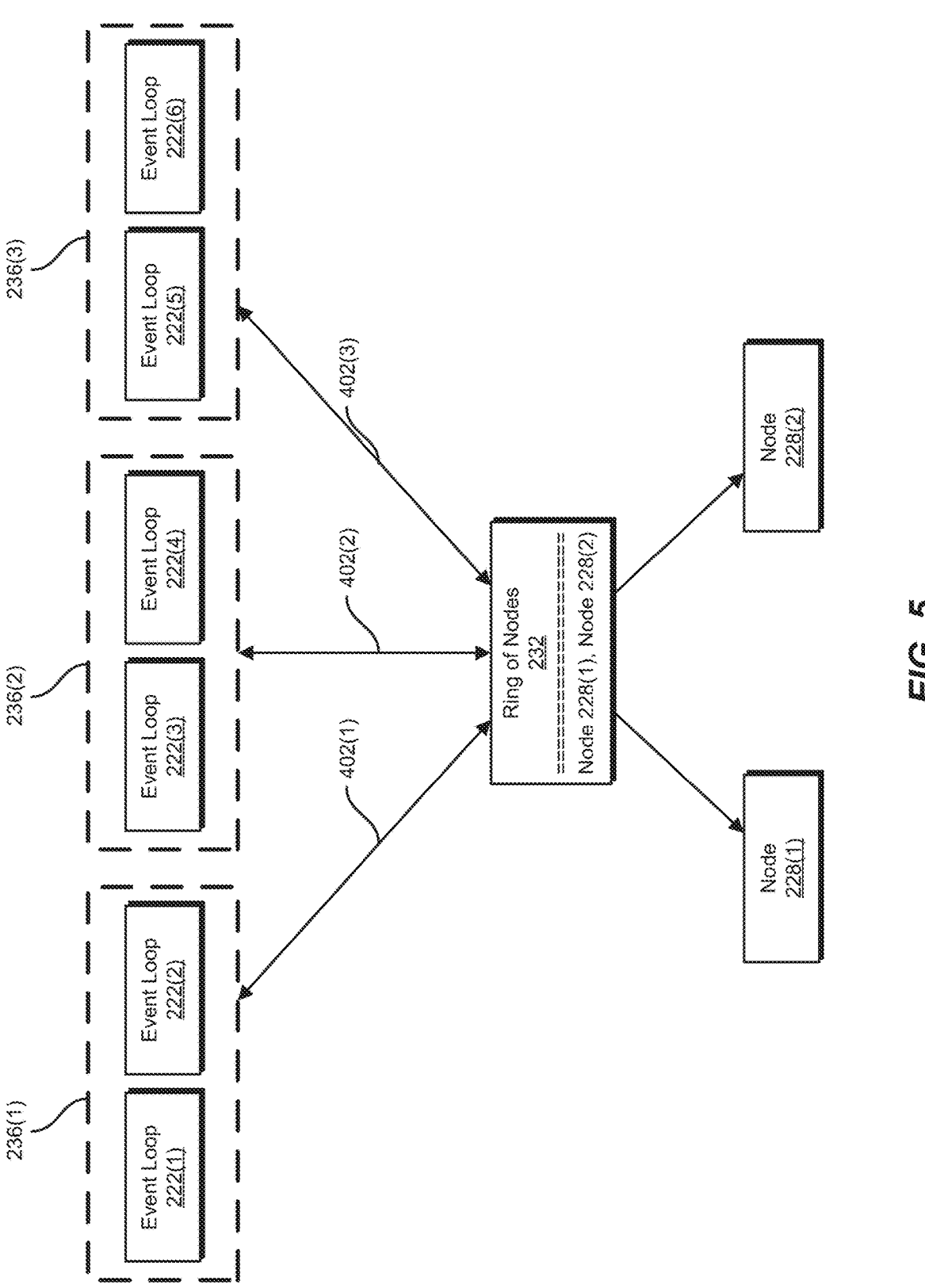
FIG. 5 is a block diagram of an exemplary connection pooling of exemplary event loops to an exemplary ring of nodes without subsets.
Figure 6:
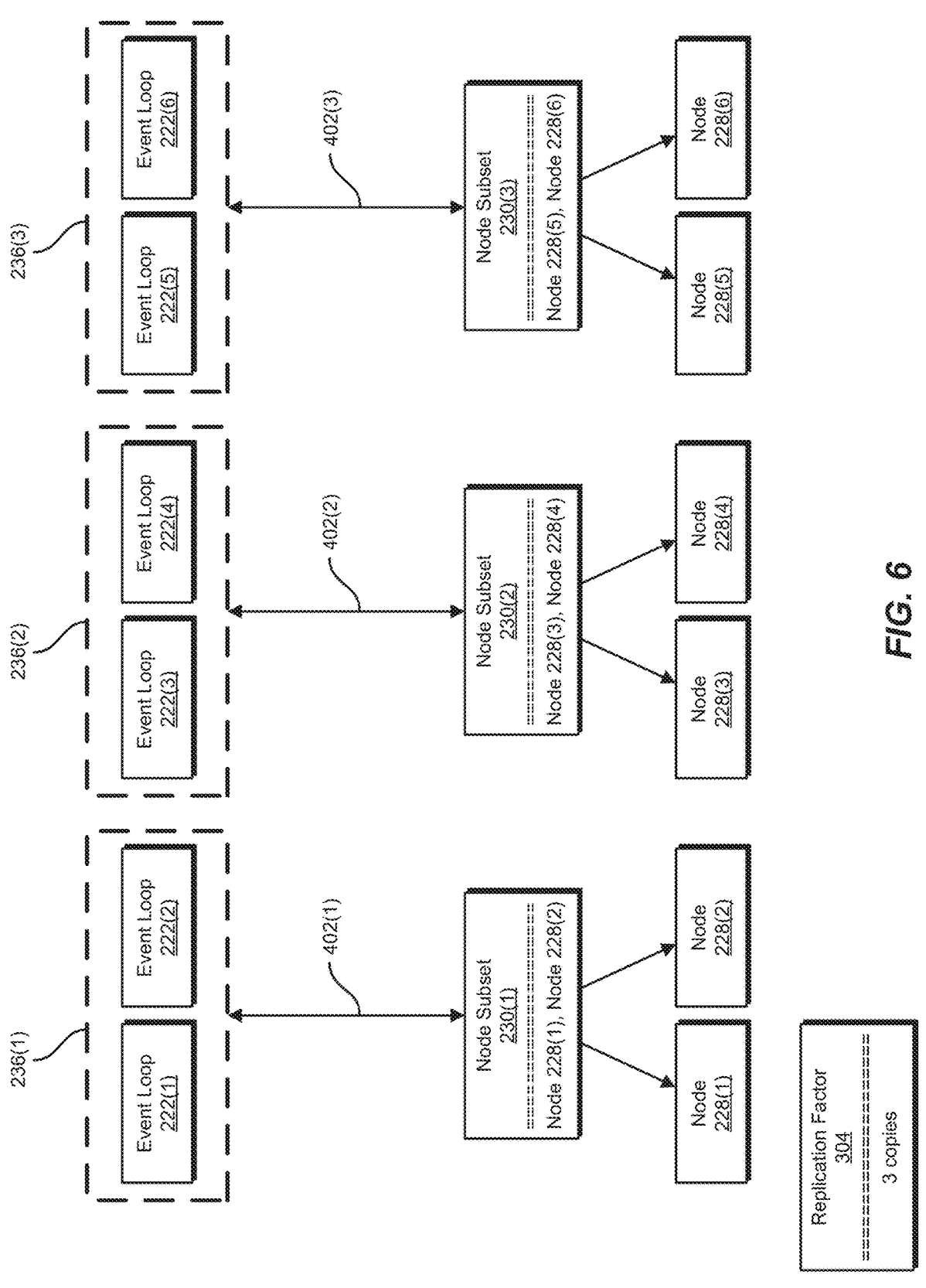
FIG. 6 is a block diagram of an exemplary connection pooling of exemplary event loops to alternate exemplary node subsets.

As illustrated in FIG. 4, event loops 222(1)-(6) may be pooled into connection pools 236(1)-(3). In this example, each connection pool of two event loops may connect to a subset of nodes, including node subsets 230(1)-(3), over connections 402(1)-(3). For example, connection pool 236 (1) of event loops 222(1)-(2) connects to node subset 230(1), which connects to nodes 228(1)-(2), over connection 402(1). In this example, creation module 218 may map event loops 222(1)-(6) to node subsets 230(1)-(3) and select node subset 230(1) for event loop 222(1). In this example, creation module 218 may then create connection pool 236(1) to multiplex event loop 222(1) with event loop 222(2) to send requests of both event loops 222(1) and 222(2) over connection 402(1). In other words, after performing filtering on inflight requests, network gateway service 208 determines the destinations of each event loop and loads the connection pools for the event loops. In this example, network gateway service 208 pulls from mapping 234 to obtain the limited subset of nodes for each event loop. In the examples of FIGS. 5-6, with different mappings of event loops to subsets, pooling of connection pools 236(1)-(3) may continue to reduce a number of connections between event loops 222 (1)-(6) and nodes.

Returning to FIG. 1, at step 150, one or more of the systems described herein may perform, by the network gateway service, load balancing of the connection pool to execute the service request. For example, a performance module 220 may, as part of computing device 202 in FIG. 2, perform load balancing of connection pool 236 to execute service request 210.

The systems described herein may perform step 150 in a variety of ways. In some examples, performance module 220 may perform load balancing by applying a load-balancing algorithm to event loop 222 and the set of other event loops of connection pool 236. In these examples, performance module 220 may then select, for event loop 222, a preferred node of node subset 230, based on utilization of each node in node subset 230, and execute service request 210 using a server of the preferred node. For example, for event loop 222(1) of FIG. 4, performance module 220 may use a power-of-two-choices algorithm to select node 228(1) from node subset 230(1) based on less usage of 228(1) at a current state. For larger subsets, performance module 220 may use a modified algorithm to select from among more than two nodes. As another example, performance module 220 may determine the amount of resources or computing power required to execute event loop 222(1) and compare it with event loop 222(2) to balance the execution appropriately. In other words, performance module 220 may perform load balancing for a loop-bound subset of nodes, rather than for all nodes of ring of nodes 232, thereby providing an additional layer of load balancing in addition to initially balancing subsets.

In some embodiments, system 200 may further include a construction module, stored in memory, that constructs ring of nodes 232 by loading instances for a set of servers, shuffling an order of the instances, and creating nodes corresponding to the order of the instances. In the example of FIG. 3, the construction module may load two instances for each of two servers and create nodes for the instances, such as nodes 228(1)-(2) for one server and nodes 228(3)-(4) for the other server. In this example, the construction module may shuffle the order of nodes 228(1)-(4) and alternate between servers.

In some embodiments, the construction module may further construct ring of nodes 232 by registering a new server for network gateway service 208 to a service registry, loading a set of instances for the new server, shuffling an updated order of the instances to include the new server, adding a new node to ring of nodes 232 corresponding to a new instance, and ordering ring of nodes 232 in the updated order of the instances. Similarly, a new instance of an existing server may be added by creating a new node and adding the new node to ring of nodes 232. The term "service registry," as used herein, generally refers to a directory indicating available services, such as a directory of servers and network services. In some examples, network gateway service may use the service registry to determine destinations of event loops and/or to map event loops to node subsets. In these embodiments, creation module 218 of FIG. 2 may further dynamically update mapping 234 of event loops to node subsets by detecting the construction module adding the new node to ring of nodes 232 and adding the new node to an existing subset, based on a target subset size.

Figure 7:
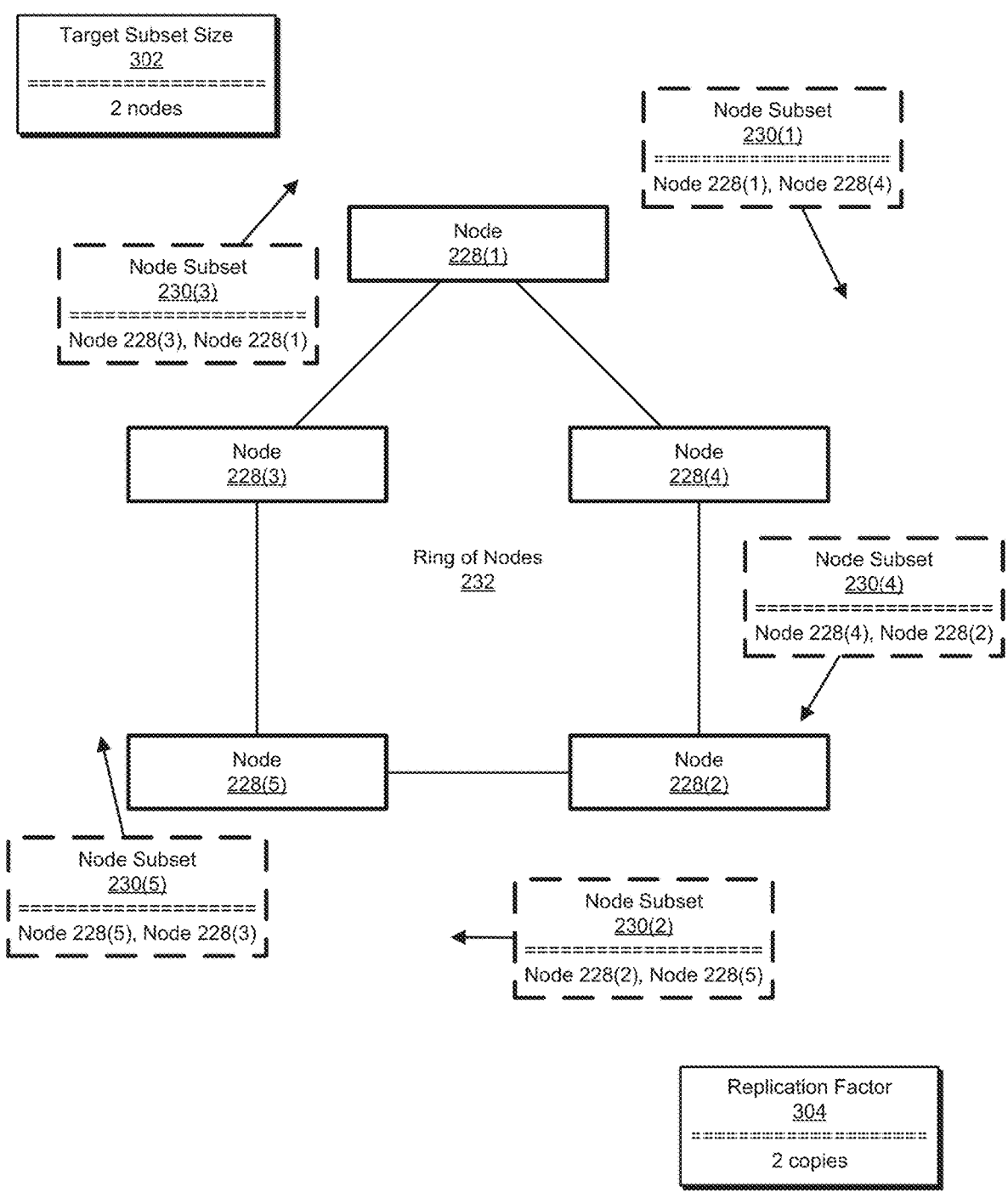
FIG. 7 is a block diagram of an update to an exemplary ring of nodes.

As illustrated in FIG. 7, a new node 228(5) may be added to ring of nodes 232 from FIG. 3. In this example, node 228(5) may be inserted into the existing order of ring of nodes 232. In other examples, nodes 228(1)-(5) may be shuffled again and reordered. In the example of FIG. 7, node subset 230(2) may be updated to include node 228(5), and a new node subset 230(5) may be created. In this example, the construction module may maintain replication factor 304, and also target subset size 302, based on similar environmental variables as rings of nodes 232 of FIG. 3. For example, by maintain replication factor 304, the construction module may avoid reshuffling ring of nodes 232, which would increase churn. In another example, the construction module may change target subset size 302 to include 3 nodes per subset while continuing to enforce replication factor 304.

In some embodiments, the construction module may further construct ring of nodes 232 by removing an existing server of network gateway service 208 from the service registry, shuffling the updated order of the instances to exclude the existing server, removing an existing node corresponding to the existing server from ring of nodes 232, and ordering the ring of nodes in the updated order of the instances. Similarly, the construction module may remove nodes corresponding to instances that are no longer available. In these embodiments, creation module 218 of FIG. 2 may further dynamically update mapping 234 of event loops to node subsets by detecting the construction module removing the existing node from ring of nodes 232, removing the existing node from at least one existing subset, and adjusting the at least one existing subset based on a target subset size. For example, if the added instance of FIG. 7 is no longer available, such as from a server failure, node 228(5) may be removed, along with node subset 230(5), and node subset 230(2) may be revised to the previous state of FIG. 3.

By elastically adjusting ring of nodes 232 and the associated node subsets, the construction module may implement a deterministic subsetting algorithm to enable stability of subsets and reduce churn in the subsets. By increasing subset size until subsets reach a target size, the construction module may scale replication factor 304 across nodes while accounting for hardware, network traffic fluctuation, and other environmental factors. As a larger-scale example, for target subset size 302 of 50 nodes and ring of nodes 232 of 400 nodes, the construction module may generate 8 subsets of 50 nodes each. Then, for a 32-core instance, the construction module may enforce a replication factor of 4 such that the subsets are not shuffled for a slight decrease of nodes. In other words, the nodes are distributed across subsets to maintain the replication factor, such as by rotating around ring of nodes 232 in order of nodes.

In the example of FIG. 5, a smaller number of total nodes may result in a lack of subsets. In this example, connection pools 236(1)-(3) may instead connect to ring of nodes 232, which effectively acts as a single subset of nodes 228(1)-(2). By maintaining connection pooling, creation module 218 may continue to reduce a total number of connections. In this example, network gateway service 208 may dynamically determine whether to perform subsetting of ring of nodes 232 in real time, based on origin nodes. For example, for an event loop running on a 64-core instance and for a set of fewer than 43 origin instances, ring of nodes 232 may not have enough instances for each potential thread. Thus, rather than load balancing by creating subsets, network gateway service 208 may load balance with a load-balancing algorithm, such as the power-of-two-choices algorithm, for ring of nodes 232.

In the example of FIG. 6, a larger number of total nodes may result in a higher replication factor and/or different node subsets. In this example, resources may be replicated on more nodes that may individually service each event loop. In other examples, node subsets may include more nodes, such as by grouping nodes 228(1)-(3) and nodes 228(4)-(6). In these examples, the construction module may adjust node subsets as the number of nodes changes, such as in the example of FIG. 7, and/or as the number of event loops change. In additional examples, the construction module may adjust node subsets to ensure load balancing is consistent and evenly distributed across nodes. In alternate examples, as the number of nodes increases, there may be less replication in subsets, and the construction module may redistribute nodes to have smaller subset sizes. Regardless of the number of nodes or origin servers, the construction module may adjust to ensure availability and divide ring of nodes 232 to fit current circumstances.

In further embodiments, the disclosed systems may include physical hardware, cloud-based instances, and/or a mixture of different types of instances or nodes. Additionally, individual instances may vary in size or type, and some cores may handle multiple threads. Thus, each node may differ in the number of threads or cores it has, and system 200 may adjust node subsets to elastically scale based on these differences by dynamically computing subset sizes, numbers of subsets, and replication factors depending on real-time detection of the networking environment.

As explained above in connection with method 100 in FIG. 1, the disclosed systems and methods may, by combining subsetting with connection pooling and other types of load balancing, improve the reduction of connection churn in network services. Specifically, the disclosed systems and methods may first generate a ring of nodes for server instances and divide the ring of nodes into subsets, based on existing network environment factors. By calculated ideal replication factors and subset sizes, the systems and methods described herein may enable adjustment of subsets to balance the load on the nodes. Additionally, by determining a target subset size, the disclosed systems and methods may ensure a good balance and resiliency for origin nodes. By updating subsets based on real-time factors, such as network traffic, the systems and methods described herein may elastically and dynamically scale subsets to account for current conditions.

The disclosed systems and methods may then assign service requests from client devices to event loops. By determining the destination of event loops through mapping event loops to node subsets, the disclosed systems and methods may then distribute event loops among node subsets. This may also enable the disclosed systems and methods to pool event loops that may share a connection to a node subset, which may decrease the number of total connections. In other words, the disclosed systems and methods effectively create subsets of event loops as well as subsets of nodes, thereby enabling maintaining fewer connections regardless of the number of nodes. Additionally, the systems and methods described herein may perform load balancing for each subset rather than for the total set of nodes. Thus, the systems and methods described herein may more efficiently and effectively execute network service requests while reducing connection churn.

Content that is created or modified using the methods described herein may be used and/or distributed in a variety of ways and/or by a variety of systems. Such systems may include content distribution ecosystems, as shown in FIGS. 8-10.

FIG. 8 is a block diagram of a content distribution ecosystem 800 that includes a distribution infrastructure 810 in communication with a content player 820. In some embodiments, distribution infrastructure 810 may be configured to encode data and to transfer the encoded data to content player 820 via data packets. Content player 820 may be configured to receive the encoded data via distribution infrastructure 810 and to decode the data for playback to a user. The data provided by distribution infrastructure 810 may include audio, video, text, images, animations, interactive content, haptic data, virtual or augmented reality data, location data, gaming data, or any other type of data that may be provided via streaming.

Distribution infrastructure 810 generally represents any services, hardware, software, or other infrastructure components configured to deliver content to end users. For example, distribution infrastructure 810 may include content aggregation systems, media transcoding and packaging services, network components (e.g., network adapters), and/or a variety of other types of hardware and software. Distribution infrastructure 810 may be implemented as a highly complex distribution system, a single media server or device, or anything in between. In some examples, regardless of size or complexity, distribution infrastructure 810 may include at least one physical processor 812 and at least one memory device 814. One or more modules 816 may be stored or loaded into memory 814 to enable adaptive streaming, as discussed herein.

Content player 820 generally represents any type or form of device or system capable of playing audio and/or video content that has been provided over distribution infrastructure 810. Examples of content player 820 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 810, content player 820 may include a physical processor 822, memory 824, and one or more modules 826. Some or all of the adaptive streaming processes described herein may be performed or enabled by modules 826, and in some examples, modules 816 of distribution infrastructure 810 may coordinate with modules 826 of content player 820 to provide adaptive streaming of multimedia content.

In certain embodiments, one or more of modules 816 and/or 826 in FIG. 8 may represent one or more software applications or programs that, when executed by a computing device, may cause the computing device to perform one or more tasks. For example, and as will be described in greater detail below, one or more of modules 816 and 826 may represent modules stored and configured to run on one or more general-purpose computing devices. One or more of modules 816 and 826 in FIG. 8 may also represent all or portions of one or more special-purpose computers configured to perform one or more tasks.

Physical processors 812 and 822 generally represent any type or form of hardware-implemented processing unit capable of interpreting and/or executing computer-readable instructions. In one example, physical processors 812 and 822 may access and/or modify one or more of modules 816 and 826, respectively. Additionally or alternatively, physical processors 812 and 822 may execute one or more of modules 816 and 826 to facilitate adaptive streaming of multimedia content. Examples of physical processors 812 and 822 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 814 and 824 generally represent any type or form of volatile or non-volatile storage device or medium capable of storing data and/or computer-readable instructions. In one example, memory 814 and/or 824 may store, load, and/or maintain one or more of modules 816 and 826. Examples of memory 814 and/or 824 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

Figure 9:
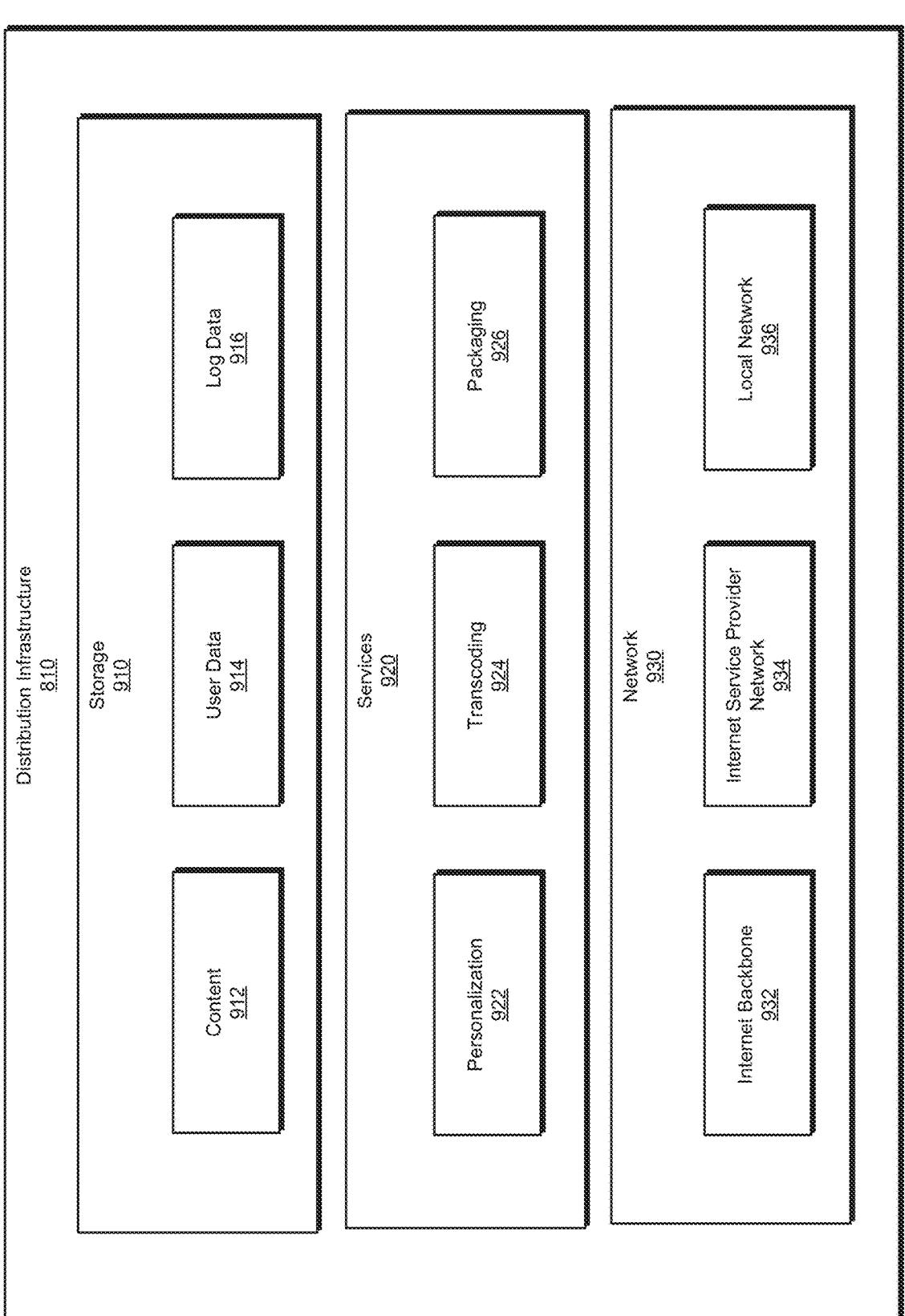
FIG. 9 is a block diagram of an exemplary distribution infrastructure within the content distribution ecosystem shown in FIG. 8.

FIG. 9 is a block diagram of exemplary components of content distribution infrastructure 810 according to certain embodiments. Distribution infrastructure 810 may include storage 910, services 920, and a network 930. Storage 910 generally represents any device, set of devices, and/or systems capable of storing content for delivery to end users. Storage 910 may include a central repository with devices capable of storing terabytes or petabytes of data and/or may include distributed storage systems (e.g., appliances that mirror or cache content at Internet interconnect locations to provide faster access to the mirrored content within certain regions). Storage 910 may also be configured in any other suitable manner.

As shown, storage 910 may store, among other items, content 912, user data 914, and/or log data 916. Content 912 may include television shows, movies, video games, user-generated content, and/or any other suitable type or form of content. User data 914 may include personally identifiable information (PII), payment information, preference settings, language and accessibility settings, and/or any other information associated with a particular user or content player. Log data 916 may include viewing history information, network throughput information, and/or any other metrics associated with a user's connection to or interactions with distribution infrastructure 810.

Services 920 may include personalization services 922, transcoding services 924, and/or packaging services 926. Personalization services 922 may personalize recommendations, content streams, and/or other aspects of a user's experience with distribution infrastructure 810. Encoding services, such as transcoding services 924, may compress media at different bitrates which may enable real-time switching between different encodings. Packaging services 926 may package encoded video before deploying it to a delivery network, such as network 930, for streaming.

Network 930 generally represents any medium or architecture capable of facilitating communication or data transfer. Network 930 may facilitate communication or data transfer via transport protocols using wireless and/or wired connections. Examples of network 930 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 9, network 930 may include an Internet backbone 932, an internet service provider 934, and/or a local network 936.

Figure 10:
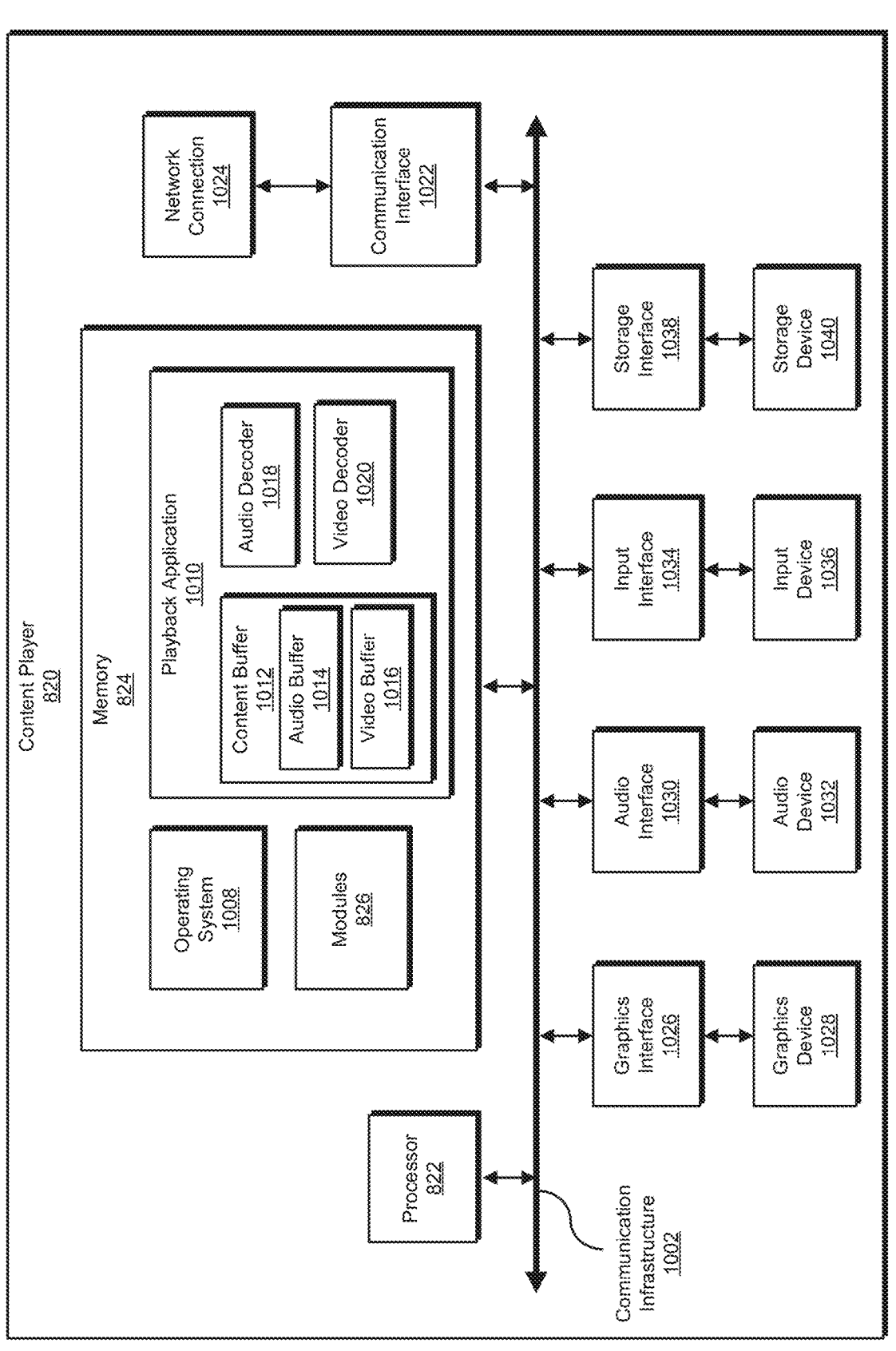
FIG. 10 is a block diagram of an exemplary content player within the content distribution ecosystem shown in FIG. 8.

FIG. 10 is a block diagram of an exemplary implementation of content player 820 of FIG. 8. Content player 820 generally represents any type or form of computing device capable of reading computer-executable instructions. Content player 820 may include, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 10, in addition to processor 822 and memory 824, content player 820 may include a communication infrastructure 1002 and a communication interface 1022 coupled to a network connection 1024. Content player 820 may also include a graphics interface 1026 coupled to a graphics device 1028, an audio interface 1030 coupled to an audio device 1032, an input interface 1034 coupled to an input device 1036, and a storage interface 1038 coupled to a storage device 1040.

Communication infrastructure 1002 generally represents any type or form of infrastructure capable of facilitating communication between one or more components of a computing device. Examples of communication infrastructure 1002 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 824 generally represents any type or form of volatile or non-volatile storage device or medium capable of storing data and/or other computer-readable instructions. In some examples, memory 824 may store and/or load an operating system 1008 for execution by processor 822. In one example, operating system 1008 may include and/or represent software that manages computer hardware and software resources and/or provides common services to computer programs and/or applications on content player 820.

Operating system 1008 may perform various system management functions, such as managing hardware components (e.g., graphics interface 1026, audio interface 1030, input interface 1034, and/or storage interface 1038). Operating system 1008 may also process memory management models for playback application 1010. The modules of playback application 1010 may include, for example, a content buffer 1012, an audio decoder 1018, and a video decoder 1020.

Playback application 1010 may be configured to retrieve digital content via communication interface 1022 and play the digital content through graphics interface 1026. A video decoder 1020 may read units of video data from audio buffer 1014 and/or video buffer 1016 and may output the units of video data in a sequence of video frames corresponding in duration to the fixed span of playback time. Reading a unit of video data from video buffer 1016 may effectively dequeue the unit of video data from video buffer 1016. The sequence of video frames may then be rendered by graphics interface 1026 and transmitted to graphics device 1028 to be displayed to a user.

In situations where the bandwidth of distribution infrastructure 810 is limited and/or variable, playback application 1010 may download and buffer consecutive portions of video data and/or audio data from video encodings with different bit rates based on a variety of factors (e.g., scene complexity, audio complexity, network bandwidth, device capabilities, etc.). In some embodiments, video playback quality may be prioritized over audio playback quality. Audio playback and video playback quality may also be balanced with each other, and in some embodiments audio playback quality may be prioritized over video playback quality.

Content player 820 may also include a storage device 1040 coupled to communication infrastructure 1002 via a storage interface 1038. Storage device 1040 generally represent any type or form of storage device or medium capable of storing data and/or other computer-readable instructions. For example, storage device 1040 may be a magnetic disk drive, a solid-state drive, an optical disk drive, a flash drive, or the like. Storage interface 1038 generally represents any type or form of interface or device for transferring data between storage device 1040 and other components of content player 820.

Many other devices or subsystems may be included in or connected to content player 820. Conversely, one or more of the components and devices illustrated in FIG. 10 need not be present to practice the embodiments described and/or illustrated herein. The devices and subsystems referenced above may also be interconnected in different ways from that shown in FIG. 10. Content player 820 may also employ any number of software, firmware, and/or hardware configurations.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a service request to be transformed, transform the service request to assign an event loop, output a result of the transformation to identify a node subset of servers, use the result of the transformation to perform connection pooling, and connect to the node subset to execute service requests for client devices. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
receiving, by a network gateway service, a service request from a client device;
assigning, by the network gateway service, the service request to an event loop;

determining, by the network gateway service, a destination of the event loop based on at least one resource of at least one node in a ring of nodes;
creating, by the network gateway service, a connection pool for the event loop to select a node subset of the ring of nodes based on a mapping of event loops to node subsets; and
performing, by the network gateway service, load balancing of the connection pool to execute the service request;
wherein the mapping of event loops to node subsets comprises an initial load balancing of the ring of nodes to evenly distribute event loops among node subsets;
wherein the initial load balancing of the ring of nodes comprises:
dynamically scaling the node subset based on a target subset size and a replication factor; and
dividing nodes of the ring of nodes into subsets based on the target subset size and the replication factor.

2. The method of claim 1, wherein the event loop comprises a mechanism to handle asynchronous requests for the network gateway service.

3. The method of claim 1, wherein determining the destination of the event loop further comprises determining the at least one node is in the selected node subset.

4. The method of claim 1, wherein the target subset size is dynamically calculated based on: a number of nodes in the ring of nodes; and the replication factor.

5. The method of claim 1, wherein the replication factor is determined based on at least one of: a type of node of the ring of nodes; a type of server of at least one node in the ring of nodes; a type of instance; a type of service request; or a network traffic profile of the network gateway service.

6. The method of claim 1, wherein dynamically scaling the node subset further comprises: determining a number of total requests; and adjusting the target subset size based on the number of total requests.

7. The method of claim 1, wherein creating the connection pool for the event loop comprises:
selecting a set of other event loops with destinations to nodes in the node subset; and
sharing a connection to the node subset for the event loop and the set of other event loops.

8. The method of claim 7, wherein sharing the connection to the node subset comprises:
multiplexing a data stream from the event loop with data streams from the set of other event loops; and
transmitting a multiplexed data stream to the node subset over the connection.

9. The method of claim 7, wherein performing load balancing of the connection pool comprises:
applying a load-balancing algorithm to the event loop and the set of other event loops of the connection pool;
selecting, for the event loop, a preferred node of the node subset based on utilization of each node in the node subset; and
executing the service request using a server of the preferred node.

10. A system comprising:
a reception module, stored in memory, that receives, by a network gateway service, a service request from a client device;
an assignment module, stored in memory, that assigns the service request to an event loop;
a determination module, stored in memory, that determines a destination of the event loop based on at least one resource of at least one node in a ring of nodes;

a creation module, stored in memory, that creates a connection pool for the event loop to select a node subset of the ring of nodes based on a mapping of event loops to node subsets;

a performance module, stored in memory, that performs load balancing of the connection pool to execute the service request; and at least one processor that executes the reception module, the assignment module, the determination module, the creation module, and the performance module;

wherein the mapping of event loops to node subsets comprises an initial load balancing of the ring of nodes to evenly distribute event loops among node subsets;

wherein the initial load balancing of the ring of nodes comprises:

dynamically scaling the node subset based on a target subset size and a replication factor; and dividing nodes of the ring of nodes into subsets based on the target subset size and the replication factor.

11. The system of claim 10, wherein the creation module further calculates the target subset size based on: a number of nodes in the ring of nodes; and the replication factor.

12. The system of claim 10, further comprising a construction module, stored in memory, that constructs the ring of nodes by:

loading instances for a set of servers;

shuffling an order of the instances; and creating nodes corresponding to the order of the instances.

13. The system of claim 12, wherein the construction module further constructs the ring of nodes by:

registering a new server for the network gateway service to a service registry;

loading a set of instances for the new server;

shuffling an updated order of the instances to include the new server;

adding a new node to the ring of nodes corresponding to a new instance; and ordering the ring of nodes in the updated order of the instances.

14. The system of claim 13, wherein the creation module further dynamically updates the mapping of event loops to node subsets by:

detecting the construction module adding the new node to the ring of nodes; and adding the new node to an existing subset, based on a target subset size.

15. The system of claim 13, wherein the construction module further constructs the ring of nodes by:

removing an existing server of the network gateway service from the service registry;

shuffling the updated order of the instances to exclude the existing server;

removing an existing node corresponding to the existing server from the ring of nodes; and ordering the ring of nodes in the updated order of the instances.

16. The system of claim 15, wherein the creation module further dynamically updates the mapping of event loops to node subsets by:

detecting the construction module removing the existing node from the ring of nodes;

removing the existing node from at least one existing subset; and adjusting the at least one existing subset based on a target subset size.

17. A non-transitory computer-readable medium comprising one or more computer-executable instructions that, when executed by at least one processor of a computing device, cause the computing device to:

receive, by a network gateway service, a service request from a client device;

assign, by the network gateway service, the service request to an event loop;

determine, by the network gateway service, a destination of the event loop based on at least one resource of at least one node in a ring of nodes;

create, by the network gateway service, a connection pool for the event loop to select a node subset of the ring of nodes based on a mapping of event loops to node subsets; and perform, by the network gateway service, load balancing of the connection pool to execute the service request;

wherein the mapping of event loops to node subsets comprises an initial load balancing of the ring of nodes to evenly distribute event loops among node subsets;

wherein the initial load balancing of the ring of nodes comprises:

dynamically scaling the node subset based on a target subset size and a replication factor; and dividing nodes of the ring of nodes into subsets based on the target subset size and the replication factor.

* * * * *